United States Patent
Mikuni (10) Patent No.: US 6,419,302 B2
(45) Date of Patent: Jul. 16, 2002

(54) CHANNEL MEMBER FOR CONSTRUCTING ELONGATED WALL PORTION OF VEHICLE BODY

(75) Inventor: Atsushi Mikuni, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/797,740

(22) Filed: Mar. 5, 2001

(30) Foreign Application Priority Data

Mar. 10, 2000 (JP) ........................................ 2000-067045

(51) Int. Cl.$^7$ .............................................. B62D 25/04
(52) U.S. Cl. .................. 296/187; 296/203.03; 52/731.6
(58) Field of Search ........................ 296/30, 187, 188, 296/146.6, 203.03, 191; 52/731.6, 731.8, 735.1, 783.11

(56) References Cited

U.S. PATENT DOCUMENTS

| | | | | |
|---|---|---|---|---|
| 1,265,990 A | * | 5/1918 | Benner ................... | 52/735.1 X |
| 4,948,196 A | * | 8/1990 | Baba et al. .................. | 296/188 |
| 4,969,680 A | * | 11/1990 | Shimoda ................. | 296/188 X |
| 5,887,938 A | * | 3/1999 | Topker et al. ............... | 296/188 |

FOREIGN PATENT DOCUMENTS

| | | | | |
|---|---|---|---|---|
| GB | 314131 | * | 6/1929 | ................ 52/731.6 |
| JP | 6-286646 | | 10/1994 | |

* cited by examiner

Primary Examiner—Dennis H. Pedder
(74) Attorney, Agent, or Firm—Oliff & Berridge, PLC (57) ABSTRACT

A channel member for constructing an elongated wall portion of a vehicle body, having, as viewed in the cross section, first and second side wall portions (12B) extending substantially perpendicularly to a direction of transverse extension of the elongated wall portion so as to define opposite sides of the channel member, first and second bottom wall portions (12F) extending substantially in parallel with the direction of transverse extension of the elongated wall portion and connected with the first and second side wall portions (12B) along adjacent ends thereof, first and second perpendicular intermediate wall portions (12G) extending substantially transversely to the direction of transverse extension of the elongated wall portion and connected with the first and second bottom wall portions (12F) along adjacent ends thereof, and a central wall portion (12E) extending between the first and second perpendicular intermediate wall portions (12G) and connected with the first and second perpendicular intermediate wall portions (12G) along adjacent ends thereof.

11 Claims, 5 Drawing Sheets

FIG. 1

PRIOR ART

CHANNEL MEMBER FOR CONSTRUCTING ELONGATED WALL PORTION OF VEHICLE BODY

BACKGROUND OF THE INVENTION

1. Field of the Invention

The present invention relates to a structural member for constructing a vehicle body, and more particularly, to a channel member for constructing a part of a vehicle body to provide an elongated wall portion thereof.

2. Description of the Prior Art

The body of a vehicle such as an automobile includes an elongated wall portion like the center pillar between the front and rear doors. The vehicle body is required to be as light as possible, while maintaining a required integrity of the body construction under a design load imposed thereon. In view of this, it was a conventional art that such an elongated wall portion is constructed by a channel member.

Figure 1:
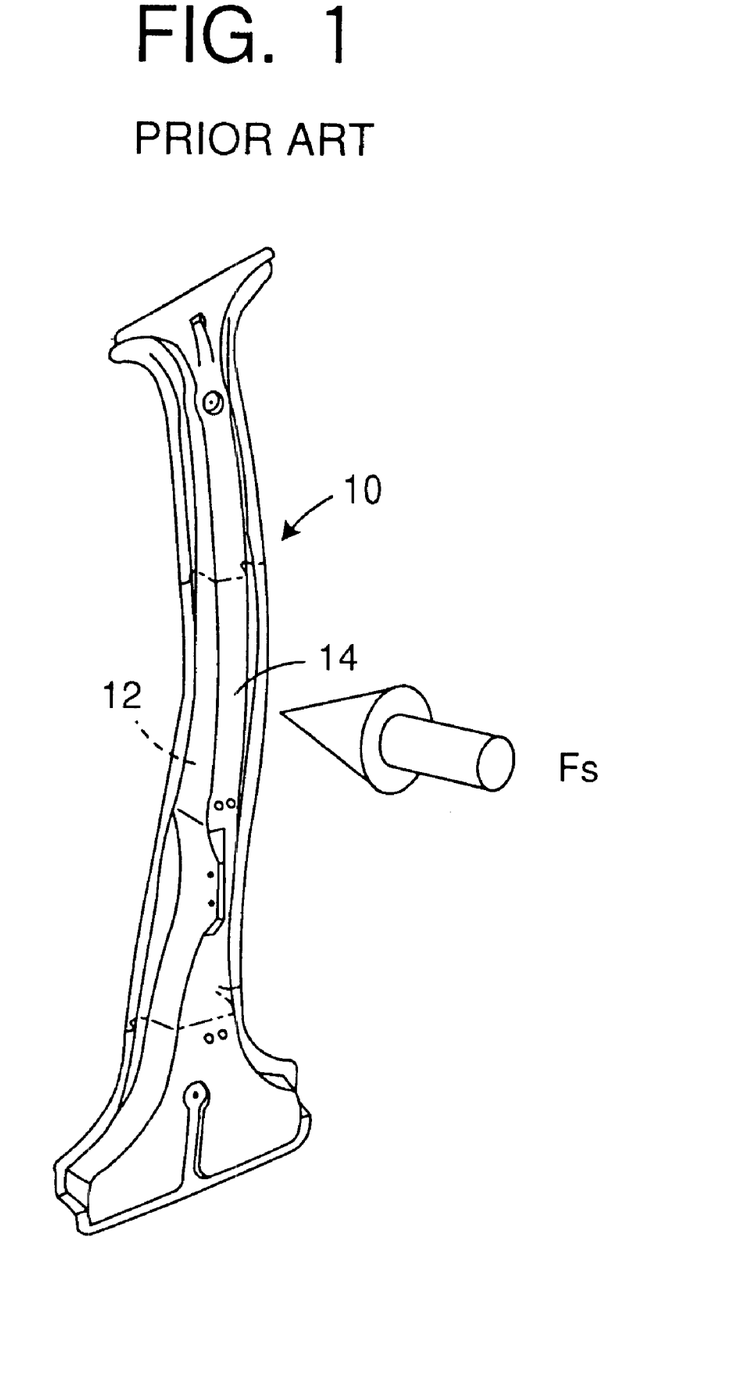
FIG. 1 is a perspective view showing a typical example of the center pillar of a four-wheeled automobile adapted to work as an elongated wall portion of the body of the automobile.
Figure 2:
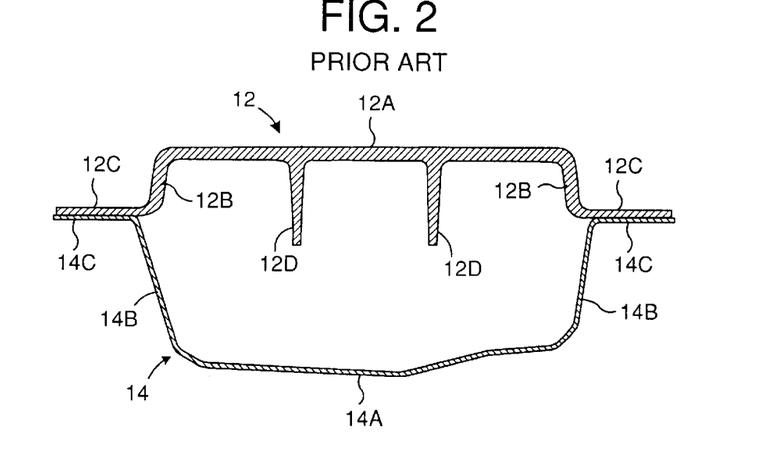
FIG. 2 shows a typical example of the conventional cross sectional construction of the center pillar like the one shown in FIG. 1.
Figure 3:
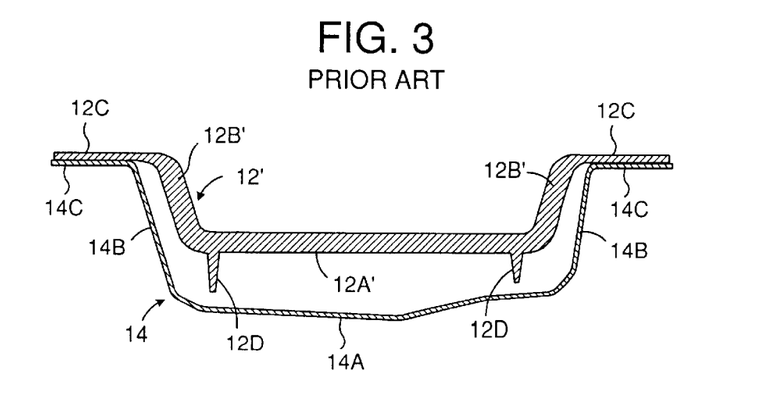
FIG. 3 shows another typical example of the conventional cross sectional construction similar to that shown in FIG. 2.

FIG. 1 shows a general construction of the center pillar of a four-wheeled automobile in a perspective view, while FIGS. 2 and 3 show two typical cross sectional constructions of such a center pillar. As depicted in these figures, the center pillar generally designated by 10 is assembled of a channel member 12 cast from, for example, an aluminum alloy or a magnesium alloy, and a cover member 14, also generally channel-shaped but essentially an outside decoration member bearing no substantial load because of its reduced thickness, press-formed from, for example, also an aluminum alloy or a magnesium alloy.

In the construction shown in FIG. 2, the channel member generally designated by 12 includes a bottom wall portion 12A extending substantially in parallel with the direction of transverse extension of the elongated wall portion (center pillar) of the vehicle body (i.e. the longitudinal direction of the vehicle body) as viewed in the cross section of the channel member, a pair of side wall portions 12B connected with the bottom wall portion 12A along adjacent ends thereof and extending substantially perpendicularly to the direction of transverse extension of the elongated wall portion as viewed in the cross section of the channel member, and a pair of flange portions 12C connected with the side wall portions 12B along adjacent ends thereof and extending substantially in parallel with the direction of transverse extension of the elongated wall portion as viewed in the cross section of the channel member. A pair of rib portions 12D are provided as connected to the bottom wall portion 12A to extend substantially perpendicularly to the direction of transverse extension of the elongated wall portion as viewed in the cross section of the channel member.

On the other hand, the cover member generally designated by 14 includes a roof wall portion 14A extending substantially in parallel with the direction of transverse extension of the elongated wall portion of the vehicle body as viewed in the cross section of the cover member, a pair of side wall portions 14B connected with the roof wall portion 14A along adjacent ends thereof and extending substantially perpendicularly to the direction of transverse extension of the elongated wall portion as viewed in the cross section of the cover member, and a pair of flange portions 14C connected with the side wall portions 14B along adjacent ends thereof and extending substantially in parallel with the direction of transverse extension of the elongated wall portion as viewed in the cross section of the cover member.

The channel member 12 and the cover member 14 are assembled together by the respective pairs of flange portions 12C and 14C being connected with one another by some spot welding.

In the construction shown in FIG. 3, the channel member 12' is different from that shown in FIG. 2 in the position of concavity thereof such that the bottom wall portion 12A in FIG. 2 is changed to a roof wall portion 12A', with an accompanying change of direction of extension of the pair of side wall portions 12B to that of a pair of side wall portions 12B'. A pair of flange portions 12C are substantially the same as in FIG. 2. In FIG. 3, other portions corresponding to those shown in FIG. 2 are designated by the same reference numerals as in FIG. 2.

In an elongated wall portion of a vehicle body such as the center pillar of a four-wheeled automobile, it is probable that an accidental side force is applied thereto at right angle to its elongation as shown by an arrow Fs in FIG. 1, tending to bend the elongated wall portion about a neutral axis of its cross section extending substantially in parallel with the direction of transverse extension of the elongated wall portion as viewed in the cross section. When it occurs, when the elongated wall portion is constructed by a relatively shallow channel member such as shown in FIGS. 2 or 3 for the convenience of design of the vehicle body, with the bottom or roof wall portion 12A or 12A' being extended substantially in parallel with the direction of transverse extension of the elongated wall portion as viewed in the cross section of the channel member, a bending moment generated by the accidental side force Fs must be reacted by a smallest geometrical moment of inertia of the cross section, i.e. a weakest bending strength of the channel member.

SUMMARY OF THE INVENTION

In view of the above-mentioned accidental probability of a side force acting at right angle to an elongated wall portion of a vehicle body constructed by a channel member and the weakness of the channel member against the side force acting substantially perpendicularly to the bottom or roof wall portion thereof, it is a primary object of the present invention to propose a channel member for constructing a part of a vehicle body to provide an elongated wall portion thereof such that the channel member has an improved strength against such a side force.

According to the present invention, the above-mentioned primary object is accomplished by a channel member for constructing a part of a vehicle body to provide an elongated wall portion thereof, comprising:

a first side wall portion extending substantially perpendicularly to a direction of transverse extension of the elongated wall portion as viewed in a cross section of the channel member, so as to define a first side of the channel member;

a second side wall portion extending substantially perpendicularly to the direction of transverse extension of the elongated wall portion as viewed in the cross section of the channel member, so as to define a second side of the channel member opposite to the first side;

a first bottom wall portion extending substantially in parallel with the direction of transverse extension of the elongated wall portion as viewed in the cross section of the channel member, the first bottom wall portion being connected with the first side wall portion along adjacent ends thereof;

a second bottom wall portion extending substantially in parallel with the direction of transverse extension of the elongated wall portion as viewed in the cross section of the channel member, the second bottom wall portion being connected with the second side wall portion along adjacent ends thereof;

a first perpendicular intermediate wall portion extending substantially perpendicularly to the direction of transverse extension of the elongated wall portion as viewed in the cross section of the channel member, the first perpendicular intermediate wall portion being connected with the first bottom wall portion along adjacent ends thereof, so as to define a first sub-channel portion together with the first side wall portion and the first bottom wall portion;

a second perpendicular intermediate wall portion extending substantially perpendicularly to the direction of transverse extension of the elongated wall portion as viewed in the cross section of the channel member, the second perpendicular intermediate wall portion being connected with the second bottom wall portion along adjacent ends thereof, so as to define a second sub-channel portion together with the second side wall portion and the second bottom wall portion; and a central wall portion extending between the first and second perpendicular intermediate wall portions, the central wall portion being connected with the first and second perpendicular intermediate wall portions along adjacent ends thereof, so as to integrally connect the first and second sub-channel portions with one another.

Figure 4:
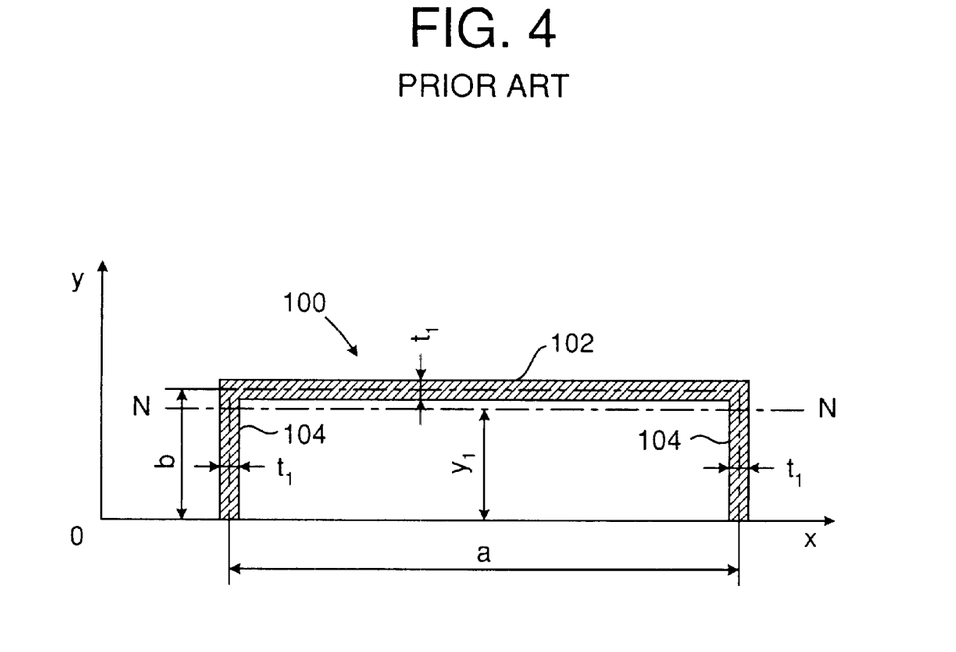
FIG. 4 illustrates a conventional cross sectional construction schematized from the cross sectional construction shown in FIG. 2 for the purpose of a bending strength analysis.
Figure 5:
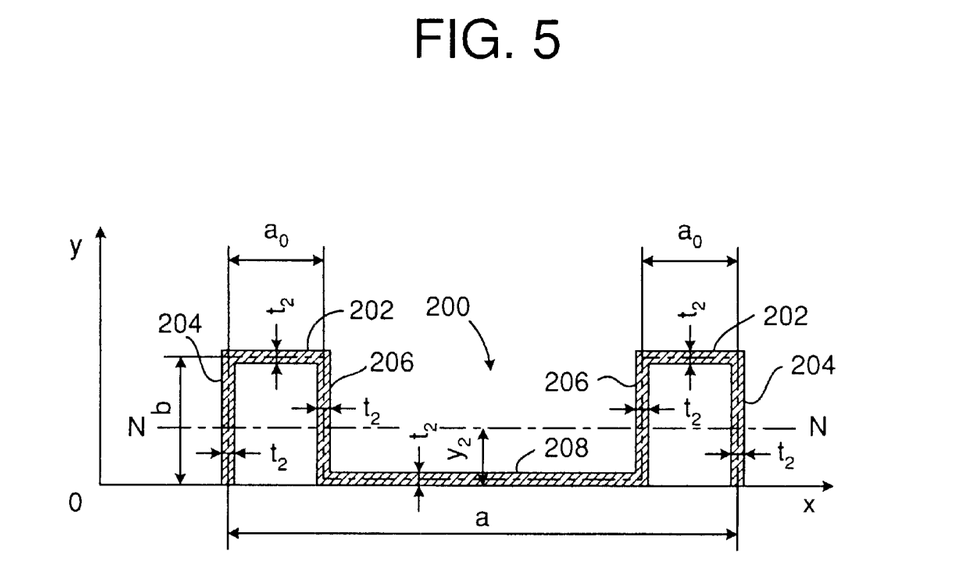
FIG. 5 illustrates a schematized basic cross sectional construction of the channel member according to the present invention for the purpose of a bending strength analysis.

The strength of a conventional channel member such as shown in FIG. 2 and that of the channel member of the above-mentioned construction according to the present invention against a side force such as force Fs shown in FIG. 1 acting to bend the channel member in its weakest bending direction will be compared with one another based upon their schematized cross sectional configurations such as shown in FIGS. 4 and 5.

The channel member 100 of FIG. 4 having a cross section schematized from the conventional cross section shown in FIG. 2 comprises a bottom wall portion 102 of a width "a" and a pair of side wall portions 104 of a depth "b", both having a thickness $t_1$. On the other hand, the channel member 200 of FIG. 5 having a cross section schematized from the above-mentioned channel member according to the present invention comprises a pair of separated bottom wall portions 202 of a width "$a_0$" corresponding to the first and second bottom wall portions, a pair of side wall portions 204 of the same depth "b" as in FIG. 4 corresponding to the first and second side wall portions, a pair of perpendicular intermediate wall portions 206 of the same depth "b" as in FIG. 4 corresponding to the first and second perpendicular intermediate wall portions, and a central wall portion 208 of a width "$a-2a_0$" corresponding to the central wall portion, all having a thickness "$t_2$".

For the sake of comparison, the amount of the material constructing the channel members 100 and 200 is assumed to be common for both. Therefore, the following condition must be satisfied:

$$t_1 \cdot (a+2 \cdot b) = t_2 \cdot (a+4 \cdot b) \tag{1}$$

Now, taking rectangular coordinates x–y as shown in FIG. 4, the position of the neutral axis N—N of the cross section of the channel member 100 extending in the flattening direction thereof is determined based upon a balance of the geometrical moment of area on opposite sides thereof, as a displacement $y_1$ from the x-axis, as follows:

$$t_1 \cdot a \cdot (b-y_1) = 2 \cdot t_1 \cdot b \cdot (y_1 - b/2) \tag{2}$$

$$\therefore y_1 = \frac{(a+b) \cdot b}{a+2 \cdot b} \tag{3}$$

Figure 6:
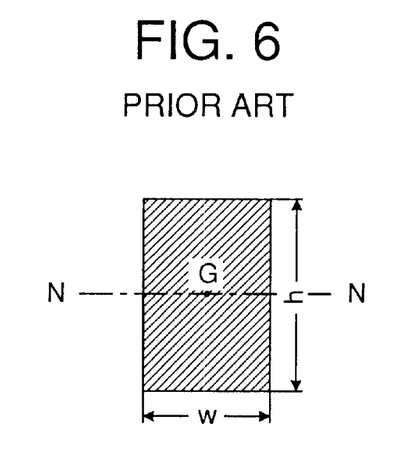
FIG. 6 illustrates a cross section of a beam or column having a rectangular cross section.

The geometrical moment of inertia I of a beam or column having a rectangular cross section such as shown in FIG. 6 about its neutral axis N—N passing the center of gravity G of the cross section is provided by a well known formula:

$$I = \frac{w \cdot h^3}{12} \tag{4}$$

Figure 7:
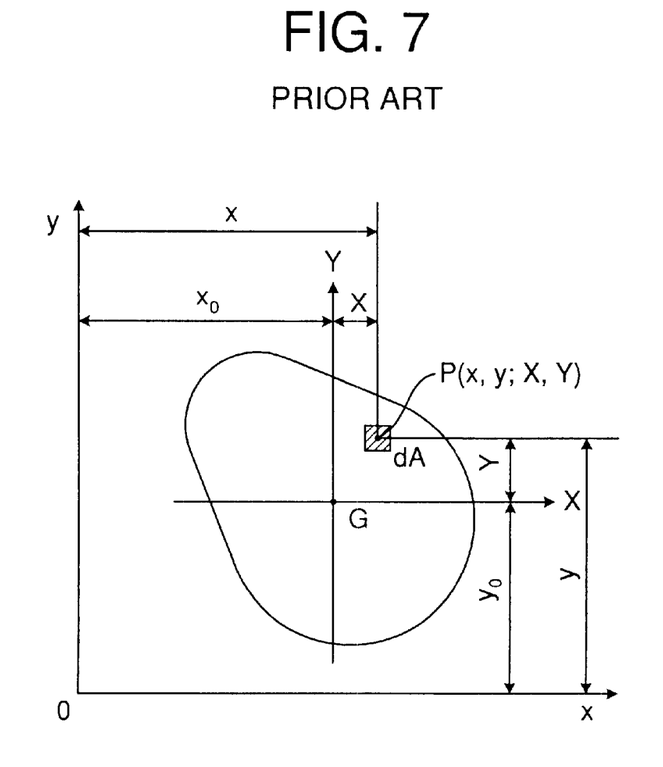
FIG. 7 illustrates an area defined on x–y coordinates in which the area is also defined by sub-coordinates X–Y for the calculation of the geometrical moment of inertia.

Further, the geometrical moment of inertia of an optional cross section such as shown in FIG. 7 about an x-axis or a y-axis is calculated from the geometrical moment of inertia of the cross section about an X-axis or a Y-axis passing the center of gravity G of the cross section, the displacement of the X-axis or the Y-axis from the x-axis or the y-axis, respectively, and an area dA of the cross section, as follows:

$$I_x = I_X + x_0^2 \cdot dA \tag{5}$$

$$I_y = I_Y + y_0^2 \cdot dA \tag{6}$$

Therefore, the geometrical moment of inertia $I_1$ of the cross section shown in FIG. 5 about its neutral axis N—N is calculated as follows:

$$I_1 = \frac{a \cdot t_1^3}{12} + t_1 \cdot a \cdot (b-y_1)^2 + 2 \cdot \frac{t_1 \cdot b^3}{12} + 2 \cdot t_1 \cdot b \cdot \left(y_1 - \frac{b}{2}\right)^2 \tag{7}$$

Similarly, taking rectangular coordinates x–y as shown in FIG. 5, the position of the neutral axis N—N of the cross section of the channel member 200 extending in the flattening direction thereof is determined based upon a balance of the geometrical moment of area on opposite sides thereof, as a displacement y2 from the x-axis, as follows:

$$2 \cdot t_2 \cdot a_0 \cdot (b-y_2) + 4 \cdot t_2 \cdot b \cdot \left(\frac{b}{2} - y_2\right) = t_2 \cdot (a - 2 \cdot a_0) \cdot \left(y_2 - \frac{t_2}{2}\right) \tag{8}$$

$$\therefore y_2 = \frac{2 \cdot (a_0 + b) \cdot b + t_2 \cdot \left(\frac{a}{2} - a_0\right)}{a + 4 \cdot b} \tag{9}$$

Then the geometrical moment of inertia $I_2$ of the cross section shown in FIG. 5 about its neutral axis N—N is calculated as follows:

$$I_2 = 2 \cdot \frac{a_0 \cdot t_2^3}{12} + 2 \cdot t_2 \cdot a_0 \cdot (b-y_2)^2 + \tag{10}$$

$$4 \cdot \frac{t_2 \cdot b^3}{12} + 4 \cdot t_2 \cdot b \cdot \left(\frac{b}{2} - y_2\right)^2 +$$

$$\frac{(a - 2 \cdot a_0) \cdot t_2^3}{12} + t_2 \cdot (a - 2 \cdot a_0) \cdot \left(y_2 - \frac{t_2}{2}\right)^2$$

In evaluating the strength of a beam or column against a bending moment, it is essential to estimate a "skin bending stress", i.e. how much a portion of the cross section remotest from the neutral axis is stressed in tension or compression by the bending moment. The stress at such a portion, when denoted as "σ", is calculated according to the bending moment denoted as "M", the geometrical moment of inertia denoted as "I", and a displacement of the remotest portion from the neutral axis N—N denoted as "e", as follows:

$$\sigma = \frac{M \cdot e}{I} \quad (11)$$

The ratio I/e is called a modulus of section. The highest bending stress is evaluated as a ratio of the bending moment M to the modulus of section denoted as "Z":

$$\sigma = \frac{M}{Z} \quad \left(\text{wherein } Z = \frac{I}{e}\right) \quad (12)$$

When the modulus of section of a channel member is greater, the skin bending stress is lower for the same bending moment applied thereto.

As an example, when a=80 mm, b=20 mm, $a_0$=15 mm, and $t_1$=3 mm, $t_2$ for satisfying the condition of equation (1) is 2.25 mm, and then $y_1$, $y_2$, $I_1$ and $I_2$ are calculated as follows:

$y_1$=16.7 mm
$y_2$=9.1 mm
$I_1$=12,180 mm$^4$
$I_2$=21,385 mm$^4$

In the channel member 100, a portion remotest from the neutral axis N=N is the free ends of the side wall portions 104 displaced from the neutral axis N—N by a distance equal to $y_1$ (i.e. 16.7 mm), while in the channel member 200, a portion remotest from the neutral axis N=N is, in the case of the above example, the separated bottom wall portions 202 displaced from the neutral axis N—N by a distance equal to b-$y_2$ (i.e. 10.9 mm). Therefore, denoting the modulus of section of the channel members 100 and 200 with respect to the neutral axis N—N as $Z_1$ and $Z_2$, respectively, $Z_1$=729 mm$^3$
$Z_2$=1,962 mm$^3$ The ratio of $Z_2/Z_1$ is 2.69. Therefore, by using the same amount of material, the maximum skin bending stress will be reduced to less than half by modifying the cross sectional construction of member 100 to that of the member 200, thereby improving the bending strength by more than two times. Further, as well known in the art, the deflection of a beam or column under a bending moment is generally inversely proportional to the geometrical moment of inertia. Therefore, the deflection of the member 200 is nearly half of that of the member 100 under the application of the same side force.

Apart from the comparison of the overall bending strength based upon the geometrical moment of inertia between the normal channel construction of the member 100 and the double-grooved channel construction of the member 200, there is another aspect of improving the strength of a beam or column member against a side force by modifying its cross sectional construction from that of the normal channel member to that of the double-grooved channel member. In the normal channel member, a pair of its free ends in the cross section inevitably form the portion remotest from the neutral axis N—N of the geometrical moment of area. However, such a free end portion is generally liable to start a breakage of the member at a lower stress. Therefore, it is not desirable that the free ends of the channel member are positioned remote from the neutral axis of the geometrical moment of area. In this regard, the double-grooved channel member according to the present invention can be so constructed that a pair of free ends are positioned close to or even on the neutral axis of the geometrical moment of area, so that the modulus of section of the free ends is made infinite, as will be appreciated with the embodiments of the invention shown and described hereinbelow.

Such an arrangement is available by that the first or second or both perpendicular intermediate wall portions extend substantially twice as much as the first or second or both side wall portions as viewed in the cross section.

For a further detail, the central wall portion may extend substantially in parallel with the direction of transverse extension of the elongated wall portion as viewed in the cross section of the channel member.

Further, the first or the second side wall portion or both may also extend substantially in the direction of transverse extension of the elongated wall portion as viewed in the cross section of the channel member, in a sense that the first or the second side wall portion or both may extend to have substantial components of extension in both directions substantially perpendicular to the direction of transverse extension of the elongated wall portion and substantially in parallel with the direction of transverse extension of the elongated wall portion as viewed in the cross section of the channel member, or in other words, the first or the second side wall portion or both may extend to incline relative to both the direction perpendicular to the direction of transverse extension of the elongated wall portion and the direction parallel with the direction of transverse extension of the elongated wall portion as viewed in the cross section of the channel member. Such a modification will further improve the bending strength of the channel member against a transversely inclined side force.

Further, the first or the second perpendicular intermediate wall portion or both may also extend substantially in the direction of transverse extension of the elongated wall portion as viewed in the cross section of the channel member, in the same sense as in the first and the second side wall portions, such that the perpendicular intermediate wall portions may extend to have substantial components of extension in both directions substantially perpendicular to the direction of transverse extension of the elongated wall portion and substantially in parallel with the direction of transverse extension of the elongated wall portion as viewed in the cross section of the channel member, or in other words, the first or the second perpendicular intermediate wall portion or both may extend to incline relative to both the direction perpendicular to the direction of transverse extension of the elongated wall portion and the direction parallel with the direction of transverse extension of the elongated wall portion as viewed in the cross section of the channel member. Such a modification will also further improve the bending strength of the channel member against a transversely inclined side force.

Further, the central wall portion may further comprises:
  a first roof wall portion extending substantially in parallel with the direction of transverse extension of the elongated wall portion as viewed in the cross section of the channel member, the first roof wall portion being connected with the first perpendicular intermediate wall portion along adjacent ends thereof;
  a second roof wall portion extending substantially in parallel with the direction of transverse extension of the elongated wall portion as viewed in the cross section of the channel member, the second roof wall portion being connected with the second perpendicular intermediate wall portion along adjacent ends thereof;

a third perpendicular intermediate wall portion extending substantially perpendicularly to the direction of transverse extension of the elongated wall portion as viewed in the cross section of the channel member, the third perpendicular intermediate wall portion being connected with the first roof wall portion along adjacent ends thereof, so as to define a first inverse sub-channel portion together with the first perpendicular intermediate wall portion and the first roof wall portion;

a fourth perpendicular intermediate wall portion extending substantially perpendicularly to the direction of transverse extension of the elongated wall portion as viewed in the cross section of the channel member, the fourth perpendicular intermediate wall portion being connected with the second roof wall portion along adjacent ends thereof, so as to define a second inverse sub-channel portion together with the second perpendicular intermediate wall portion and the second roof wall portion; and a third bottom wall portion extending substantially in parallel with the direction of transverse extension of the elongated wall portion as viewed in the cross section of the channel member, the third bottom wall portion being connected with the third and fourth perpendicular intermediate wall portions along adjacent ends thereof, so as to define a third sub-channel portion together with the third and fourth perpendicular intermediate wall portions. In this case, the channel member will be constructed to be a triply-grooved channel member.

Further, the channel member according to the present invention may further comprise:

a first flange portion extending substantially in parallel with the direction of transverse extension of the elongated wall portion as viewed in the cross section of the channel member, the first flange portion being connected with the first side wall portion along adjacent ends thereof, so as to provide a first margin for connection with a cover member; and a second flange portion extending substantially in parallel with the direction of transverse extension of the elongated wall portion as viewed in the cross section of the channel member, the second flange portion being connected with the second side wall portion along adjacent ends thereof, so as to provide a second margin for connection with the cover member.

BRIEF DESCRIPTION OF THE DRAWINGS

In the accompanying drawings.

DESCRIPTION OF THE EMBODIMENTS

Figure 8:
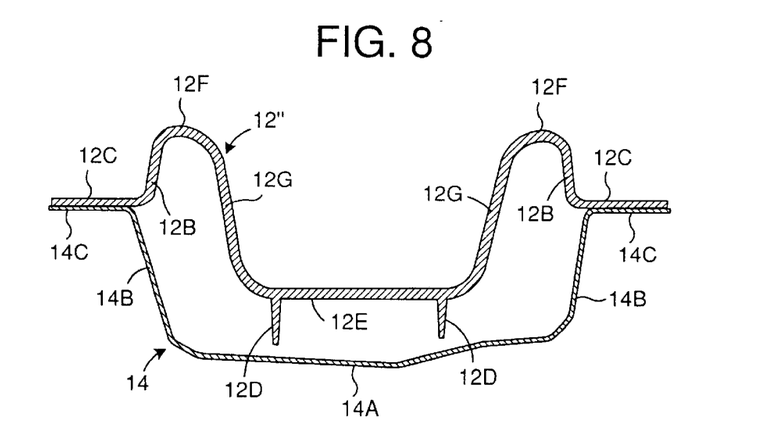
FIG. 8 is a cross sectional view of a first embodiment of the channel member according to the present invention in the form assembled with a cover member to provide the center pillar like the one shown in FIG. 1.

Referring to FIG. 8 showing the first embodiment, it will be appreciated that the channel member of this embodiment has a cross section substantially the same in principle as that of the channel member 200 shown in FIG. 5. Since the channel member of FIG. 8 includes some wall portions similar to those of the conventional channel member shown in FIG. 2, in FIG. 8 the wall portions corresponding to those shown in FIG. 2 are designated by the same reference numerals as in FIG. 2.

As shown in FIG. 8, the channel member of this embodiment, generally designated by 12", comprises first and second side wall portions 12B constructed to be symmetrical to one another with respect to a phantom longitudinal center plane (not shown) for convenience, the first and second side wall portions 12B extending substantially perpendicularly to as well as in parallel with a direction of transverse extension of the elongated wall portion of a vehicle body which this channel member constructs, as viewed in the cross section of the channel member, so as to define first and second sides of the channel member. As already noted, the two directional extension of the side wall portions 12B means that the side wall portions extend to have substantial components of extension in both directions substantially perpendicular to the direction of transverse extension of the elongated wall portion and substantially in parallel with the direction of transverse extension of the elongated wall portion as viewed in the cross section of the channel member, so that the side wall portions extend to incline relative to both the direction perpendicular to the direction of transverse extension of the elongated wall portion and the direction parallel with the direction of transverse extension of the elongated wall portion as viewed in the cross section of the channel member. As also already noted, such an inclination of the side walls further improves the bending strength of the channel member against a transversely inclined side force.

The channel member 12" of FIG. 8 further comprises first and second bottom wall portions 12F constructed also to be symmetrical to one another with respect to the center plane for convenience, the first and second bottom wall portions 12F extending substantially in parallel with the direction of transverse extension of the elongated wall portion, as viewed in the cross section of the channel member, and connected with the first and second side wall portions 12B along adjacent ends thereof.

The channel member 12" of FIG. 8 further comprises first and second perpendicular intermediate wall portions 12G constructed also to be symmetrical to one another with respect to the center plane for convenience, the first and second perpendicular intermediate wall portions 12G extending substantially perpendicularly to as well as in parallel with the direction of transverse extension of the elongated wall portion, as viewed in the cross section of the channel member, and connected with the first and second bottom wall portions 12F along adjacent ends thereof so as to define first and second sub-channel portions together with the first and second side wall portion 12B and the first and second bottom wall portions 12F. As already noted, the two directional extension of the perpendicular intermediate wall portions 12B also means that the perpendicular intermediate wall portions extend to have substantial components of extension in both directions substantially perpendicular to the direction of transverse extension of the elongated wall portion and substantially in parallel with the direction of transverse extension of the elongated wall portion as viewed in the cross section of the channel member, so that the perpendicular intermediate wall portions extend to incline relative to both the direction perpendicular to the direction of transverse extension of the elongated wall portion and the direction parallel with the direction of transverse extension of the elongated wall portion as viewed in the cross section of the channel member, such an inclination of the perpendicular intermediate wall portions also further improving the bending strength of the channel member against transversely inclined side force.

The channel member 12" of FIG. 8 further comprises a central wall portion 12E extending between the first and second perpendicular intermediate wall portions 12G, and connected with the first and second perpendicular intermediate wall portions 12G along adjacent ends thereof, so as to integrally connect the first and second sub-channel portions with one another. In this embodiment, the central wall portion 12E extends substantially in parallel with the direction of transverse extension of the elongated wall portion as viewed in the cross section of the channel member. In the shown embodiment, first and second rib portions 12D constructed also to be symmetrical to one another with respect to the center plane for convenience are provided on the central wall portion 12E for further increasing the bending strength of the channel member.

The channel member 12" of FIG. 8 further comprises first and second flange portions 12C constructed also to be symmetrical to one another with respect to the center plane for convenience, the first and second flange portions 12C extending substantially in parallel with the direction of transverse extension of the elongated wall portion as viewed in the cross section of the channel member, and connected with the first and second side wall portions 12B along adjacent ends thereof, so as to provide first and second margins for connection with a cover channel member 14 similar to that assembled with the conventional channel member shown in FIG. 2. The cover member for assembly with the channel member 12 of FIG. 8 is substantially the same as that assembled with the channel member of FIG. 2, also comprising a roof wall portion 14A, a pair of side wall portions 14B and a pair of flange portions 14C, and assembled with the channel member 12" by the flange portions 14C being spot welded to the flange portions 12C of the channel member 12".

As will be appreciated from the cross sectional construction of the channel member 12" shown in FIG. 8, when the channel member is so designed that the first or second or both perpendicular intermediate wall portions 12G extend substantially twice as much as the first or second or both side wall portions 12B, the pair of flange portions 12C forming the free ends of the channel member are positioned close to or even on the neutral axis (not shown in FIG. 8 but obvious) of the geometrical moment of area of the cross section, so that the above-mentioned modulus of section becomes very great or infinite. Therefore, it is effectively avoided that a breakage is started from a free end portion at a lower stress when the channel member is applied with a side force. This advantage is also available in other embodiments of the invention described hereinbelow.

Figure 9:
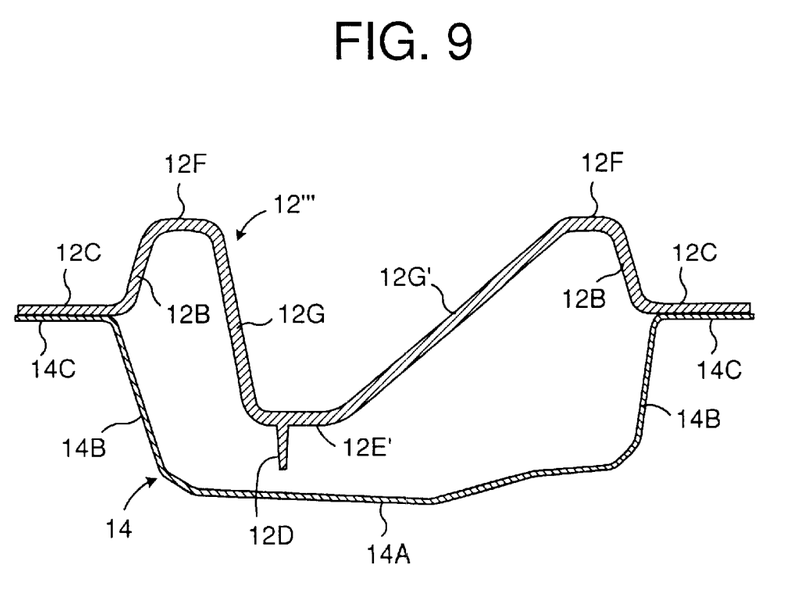
FIG. 9 is a cross sectional view similar to FIG. 8, showing a second embodiment of the present invention.

FIG. 9 is a view similar to FIG. 8, showing a second embodiment of the present invention in a similar assembly with a similar cover member as in FIG. 8. In this embodiment, the channel member 12''' comprises the first and second perpendicular intermediate wall portions 12G and 12G' in an unsymmetrical arrangement with respect to the phantom center plane by the second perpendicular intermediate wall portion 12G' being more inclined relative to the direction perpendicular to the direction of transverse extension of the elongated wall portion as viewed in the cross section, with a corresponding reduction of the center wall portion such as shown by 12E'. Other portions substantially the same as in the construction shown in FIG. 8 are designated by the same reference numerals as in FIG. 8, operating substantially in the same manner. This embodiment will show a more improved bending strength when the direction of a side force is inclined to be more parallel to the perpendicular intermediate wall portion 12G' as viewed in the cross section.

Figure 10:
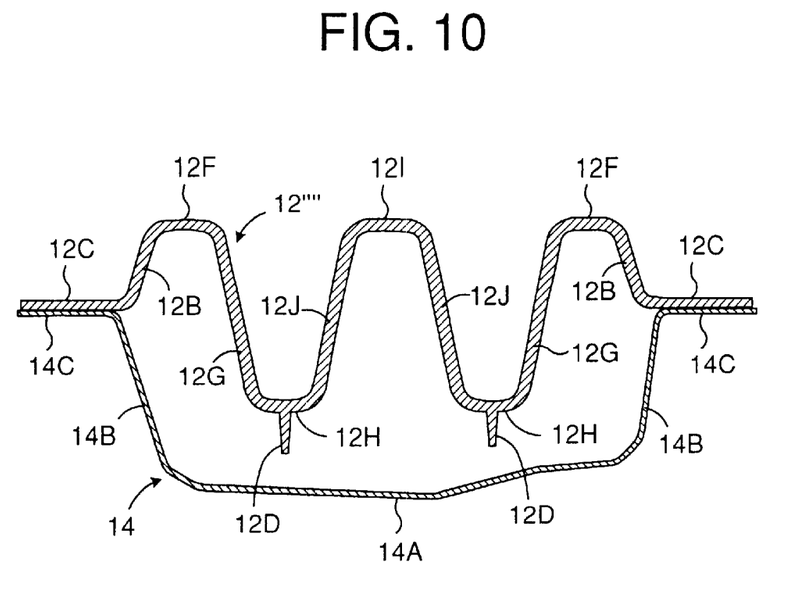
FIG. 10 is a cross sectional view similar to FIGS. 8 and 9, showing a third embodiment of the present invention.

FIG. 10 is a view similar to FIGS. 8 and 9, showing a third embodiment of the present invention in a similar assembly with a similar cover member as in FIGS. 8 and 9. In the channel member 12"" of this embodiment, the central wall portion comprises first and second roof wall portions 12H constructed to be symmetrical to one another with respect to the phantom center plane for convenience, the first and second roof wall portions 12H extending substantially in parallel with the direction of transverse extension of the elongated wall portion as viewed in the cross section of the channel member, and connected with the first and second perpendicular intermediate wall portions 12G along adjacent ends thereof, third and fourth perpendicular intermediate wall portions 12J constructed to be symmetrical to one another with respect to the phantom center plane for convenience, the third and fourth perpendicular intermediate wall portions 12J extending substantially perpendicularly to the direction of transverse extension of the elongated wall portion as viewed in the cross section of the channel member, and connected with the first roof wall portion 12H along adjacent ends thereof so as to define first and second inverse sub-channel portion together with the first and second perpendicular intermediate wall portions 12G and the first and second roof wall portions 12H, and a third bottom wall portion 12I extending substantially in parallel with the direction of transverse extension of the elongated wall portion as viewed in the cross section of the channel member, and connected with the third and fourth perpendicular intermediate wall portions 12J along adjacent ends thereof, so as to define a third sub-channel portion together with the third and fourth perpendicular intermediate wall portions 12J. Other portions substantially the same as in the construction shown in FIGS. 8 and 9 are designated by the same reference numerals as in FIGS. 8 and 9, operating substantially in the same manner. On analogy of the comparison of the constructions of FIGS. 4 and 5, this embodiment will show a further improvement in the bending strength as compared with the embodiment of FIG. 8.

As will be appreciated from the shapes depicted in FIGS. 8, 9 and 10, the concept of the channel member according to the present invention may alternatively be considered to corrugate the channel wall between a pair of opposite free ends as viewed in the cross section thereof so that the neutral axis of the geometrical moment of area lies close to a straight line connecting the opposite free ends. Therefore, although no further modification of such corrugation is shown in the figure to avoid the redundancy of illustration, it will be apparent for those skill in the art that other various combinations of the above-mentioned wall portions extending substantially perpendicular to or in parallel with the direction of transverse extension of the elongated wall portion provided by the channel member are useful in constructing a structure such as the center pillar of automobiles.

Although the present invention has been described in detail with respect to several embodiments thereof in the above, it will be apparent for those skilled in the art that various modifications are possible with respect to these embodiments within the scope of the present invention.

What is claimed is:

1. A channel member for constructing a part of a vehicle body to provide an elongated wall portion thereof, comprising:

a first side wall portion extending substantially perpendicularly to a direction of transverse extension of the elongated wall portion as viewed in a cross section of the channel member, so as to define a first side of the channel member;

a second side wall portion extending substantially perpendicularly to the direction of transverse extension of the elongated wall portion as viewed in the cross section of the channel member, so as to define a second side of the channel member opposite to the first side;

a first bottom wall portion extending substantially in parallel with the direction of transverse extension of the elongated wall portion as viewed in the cross section of the channel member, the first bottom wall portion being connected with the first side wall portion along adjacent ends thereof;

a second bottom wall portion extending substantially in parallel with the direction of transverse extension of the elongated wall portion as viewed in the cross section of the channel member, the second bottom wall portion being connected with the second side wall portion along adjacent ends thereof;

a first perpendicular intermediate wall portion extending substantially perpendicularly to the direction of transverse extension of the elongated wall portion substantially twice as much as the first side wall portion as viewed in the cross section of the channel member, the first perpendicular intermediate wall portion being connected with the first bottom wall portion along adjacent ends thereof, so as to define a first sub-channel portion together with the first side wall portion and the first bottom wall portion;

a second perpendicular intermediate wall portion extending substantially perpendicularly to the direction of transverse extension of the elongated wall portion substantially twice as much as the second side wall portion as viewed in the cross section of the channel member, the second perpendicular intermediate wall portion being connected with the second bottom wall portion along adjacent ends thereof, so as to define a second sub-channel portion together with the second side wall portion and the second bottom wall portion;

a central wall portion extending between the first and second perpendicular intermediate wall portions, the central wall portion being connected with the first and second perpendicular intermediate wall portions along adjacent ends thereof, so as to integrally connect the first and second sub-channel portions with one another;

a first flange portion extending substantially in the direction of transverse extension of the elongated wall portion as viewed in the cross section of the channel member, the first flange portion being connected with the first side wall portion along adjacent ends thereof, so as to provide a first margin for connection with a cover member; and a second flange portion extending substantially in the direction of transverse extension of the elongated wall portion as viewed in the cross section of the channel member, the second flange portion being connected with the second side wall portion along adjacent ends thereof, so as to provide a second margin for connection with the cover member.

2. A channel member according to claim 1, wherein the central wall portion extends substantially in parallel with the direction of transverse extension of the elongated wall portion as viewed in the cross section of the channel member.

3. A channel member according to claim 1, wherein the first side wall portion also extends substantially in the direction of transverse extension of the elongated wall portion as viewed in the cross section of the channel member.

4. A channel member according to claim 3, wherein the second side wall portion also extends substantially in the direction of transverse extension of the elongated wall portion as viewed in the cross section of the channel member.

5. A channel member according to claim 1, wherein the first perpendicular intermediate wall portion also extends substantially in the direction of transverse extension of the elongated wall portion as viewed in the cross section of the channel member.

6. A channel member according to claim 5, wherein the second perpendicular intermediate wall portion also extends substantially in the direction of transverse extension of the elongated wall portion as viewed in the cross section of the channel member.

7. A channel member according to claim 1, wherein the central wall portion comprises:

a first roof wall portion extending substantially in parallel with the direction of transverse extension of the elongated wall portion as viewed in the cross section of the channel member, the first roof wall portion being connected with the first perpendicular intermediate wall portion along adjacent ends thereof;

a second roof wall portion extending substantially in parallel with the direction of transverse extension of the elongated wall portion as viewed in the cross section of the channel member, the second roof wall portion being connected with the second perpendicular intermediate wall portion along adjacent ends thereof;

a third perpendicular intermediate wall portion extending substantially perpendicularly to the direction of transverse extension of the elongated wall portion as viewed in the cross section of the channel member, the third perpendicular intermediate wall portion being connected with the first roof wall portion along adjacent ends thereof, so as to define a first inverse sub-channel portion together with the first perpendicular intermediate wall portion and the first roof wall portion;

a fourth perpendicular intermediate wall portion extending substantially perpendicularly to the direction of transverse extension of the elongated wall portion as viewed in the cross section of the channel member, the fourth perpendicular intermediate wall portion being connected with the second roof wall portion along adjacent ends thereof, so as to define a second inverse sub-channel portion together with the second perpendicular intermediate wall portion and the second roof wall portion; and a third bottom wall portion extending substantially in parallel with the direction of transverse extension of the elongated wall portion as viewed in the cross section of the channel member, the third bottom wall portion being connected with the third and fourth perpendicular intermediate wall portions along adjacent ends thereof, so as to define a third sub-channel portion together with the third and fourth perpendicular intermediate wall portions.

8. A channel member for constructing a part of a vehicle body to provide an elongated wall portion thereof, comprising:

a first side wall portion extending substantially perpendicularly to a direction of transverse extension of the elongated wall portion as viewed in a cross section of the channel member, so as to define a first side of the channel member;

a second side wall portion extending substantially perpendicularly to the direction of transverse extension of the elongated wall portion as viewed in the cross section of the channel member, so as to define a second side of the channel member opposite to the first side;

a first bottom wall portion extending substantially in parallel with the direction of transverse extension of the elongated wall portion as viewed in the cross section of the channel member, the first bottom wall portion being connected with the first side wall portion along adjacent ends thereof;

a second bottom wall portion extending substantially in parallel with the direction of transverse extension of the elongated wall portion as viewed in the cross section of the channel member, the second bottom wall portion being connected with the second side wall portion along adjacent ends thereof;

a first intermediate wall portion extending substantially perpendicularly to the direction of transverse extension of the elongated wall portion substantially twice as much as the first side wall portion as viewed in the cross section of the channel member, the first intermediate wall portion being connected with the first bottom wall portion along adjacent ends thereof, so as to define a first sub-channel portion together with the first side wall portion and the first bottom wall portion;

a second intermediate wall portion extending as inclined to the direction of transverse extension of the elongated wall portion with a substantially twice as much perpendicular extension in the direction perpendicular to the transverse extension as the second side wall portion as viewed in the cross section of the channel member, the second intermediate wall portion being connected with the second bottom wall portion along adjacent ends thereof, so as to define a second sub-channel portion together with the second side wall portion and the second bottom wall portion; and a central wall portion extending between the first and second intermediate wall portions, the central wall portion being connected with the first and second intermediate wall portions along adjacent ends thereof, so as to integrally connect the first and second sub-channel portions with one another;

a first flange portion extending substantially in the direction of transverse extension of the elongated wall portion as viewed in the cross section of the channel member, the first flange portion being connected with the first side wall portion along adjacent ends thereof, so as to provide a first margin for connection with a cover member; and a second flange portion extending substantially in the direction of transverse extension of the elongated wall portion as viewed in the cross section of the channel member, the second flange portion being connected with the second side wall portion along adjacent ends thereof, so as to provide a second margin for connection with the cover member.

9. A channel member according to claim 8, wherein the first side wall portion also extends substantially in the direction of transverse extension of the elongated wall portion as viewed in the cross section of the channel member.

10. A channel member according to claim 9, wherein the second side wall portion also extends substantially in the direction of transverse extension of the elongated wall portion as viewed in the cross section of the channel member.

11. A channel member according to claim 8, wherein the first intermediate wall portion also extends substantially in the direction of transverse extension of the elongated wall portion as viewed in the cross section of the channel member.

* * * * *